United States Patent
Pape et al.

(10) Patent No.: US 9,722,425 B2
(45) Date of Patent: Aug. 1, 2017

(54) DETERMINING A STRING CONFIGURATION IN A MULTISTRING-INVERTER

(71) Applicant: SMA Solar Technology AG, Niestetal (DE)

(72) Inventors: Sybille Pape, Vellmar (DE); Tobias Mueller, Escherode (DE)

(73) Assignee: SMA Solar Technology AG, Niestetal (DE)

( * ) Notice: Subject to any disclaimer, the term of this patent is extended or adjusted under 35 U.S.C. 154(b) by 421 days.

(21) Appl. No.: 14/552,638

(22) Filed: Nov. 25, 2014

(65) Prior Publication Data

US 2015/0076911 A1 Mar. 19, 2015

Related U.S. Application Data

(63) Continuation of application No. PCT/EP2013/060580, filed on May 23, 2013.

(30) Foreign Application Priority Data

May 25, 2012 (DE) .................. 10 2012 104 560

(51) Int. Cl.
*H02J 7/34* (2006.01)
*H02J 1/10* (2006.01)
(Continued)

(52) U.S. Cl.
CPC ............... *H02J 1/12* (2013.01); *H02J 3/383* (2013.01); *H02M 3/04* (2013.01); *H02M 7/44* (2013.01);
(Continued)

(58) Field of Classification Search
CPC .... H02J 3/383; H02J 7/35; H02J 3/385; H02J 3/32; H02J 1/00; H02J 13/0003;
(Continued)

(56) References Cited

U.S. PATENT DOCUMENTS

| 7,965,088 B2 | 6/2011 | Thorngreen et al. |
| 8,058,752 B2 * | 11/2011 | Erickson, Jr. ............ G05F 1/67 307/150 |

(Continued)

FOREIGN PATENT DOCUMENTS

| EP | 2061143 A2 | 5/2009 |
| EP | 2337184 A2 | 6/2011 |
| WO | 2006133714 A1 | 12/2006 |

OTHER PUBLICATIONS

Jung-Min Kwon et al.: "Grid-Connected Photovoltaic Multistring PCS With PV Current Variation Reduction Control", IEEE Trans. on Industrial Electronics, IEEE Service Center, Piscataway, NJ, USA, vol. 56, No. 11, Nov. 2009, pp. 4381-4388, XP011266932.

(Continued)

*Primary Examiner* — Lincoln Donovan
*Assistant Examiner* — Diana J Cheng
(74) *Attorney, Agent, or Firm* — Eschweiler & Potashnik, LLC

(57) ABSTRACT

In operating an inverter including input connectors, (i) to which strings of photovoltaic cells are connected, (ii) each of which is connected via a DC/DC converter to a common DC voltage link, and (iii) which are bridgeable, the partial powers flowing through the individual DC/DC converters are determined, and for some time at least two DC/DC converters are either operated with the aim of balancing the partial currents flowing through them or connected through. During this operation or connecting through, the partial powers flowing through the at least two DC/DC converters are compared with each other, and if a difference between the partial powers exceeds a threshold value, the DC/DC converters are subsequently operated in a way adjusted to the fact that they connect different strings to the DC voltage link.

15 Claims, 1 Drawing Sheet

(51) Int. Cl.
- *H02J 3/38* (2006.01)
- *H02J 1/12* (2006.01)
- *H02M 3/04* (2006.01)
- *H02M 7/44* (2006.01)
- *H02M 1/00* (2006.01)

(52) U.S. Cl.
CPC .... *H02M 2001/0048* (2013.01); *Y02E 10/563* (2013.01); *Y10T 307/549* (2015.04)

(58) Field of Classification Search
CPC ........ H02J 3/38; H02J 5/00; H02J 7/34; H02J 1/10; H02J 1/12; H02J 1/14; Y02E 10/563; Y02E 10/50; Y02E 10/52; H02M 7/44
USPC ..................................................... 307/52–63
See application file for complete search history.

(56) References Cited

U.S. PATENT DOCUMENTS

2011/0204878 A1    8/2011  Thorngreen et al.
2011/0316346 A1*  12/2011  Porter ..................... G05F 1/67
                                                               307/82

OTHER PUBLICATIONS

International Search Report dated Oct. 7, 2013 for international application No. PCT/EP2013/060580.

* cited by examiner

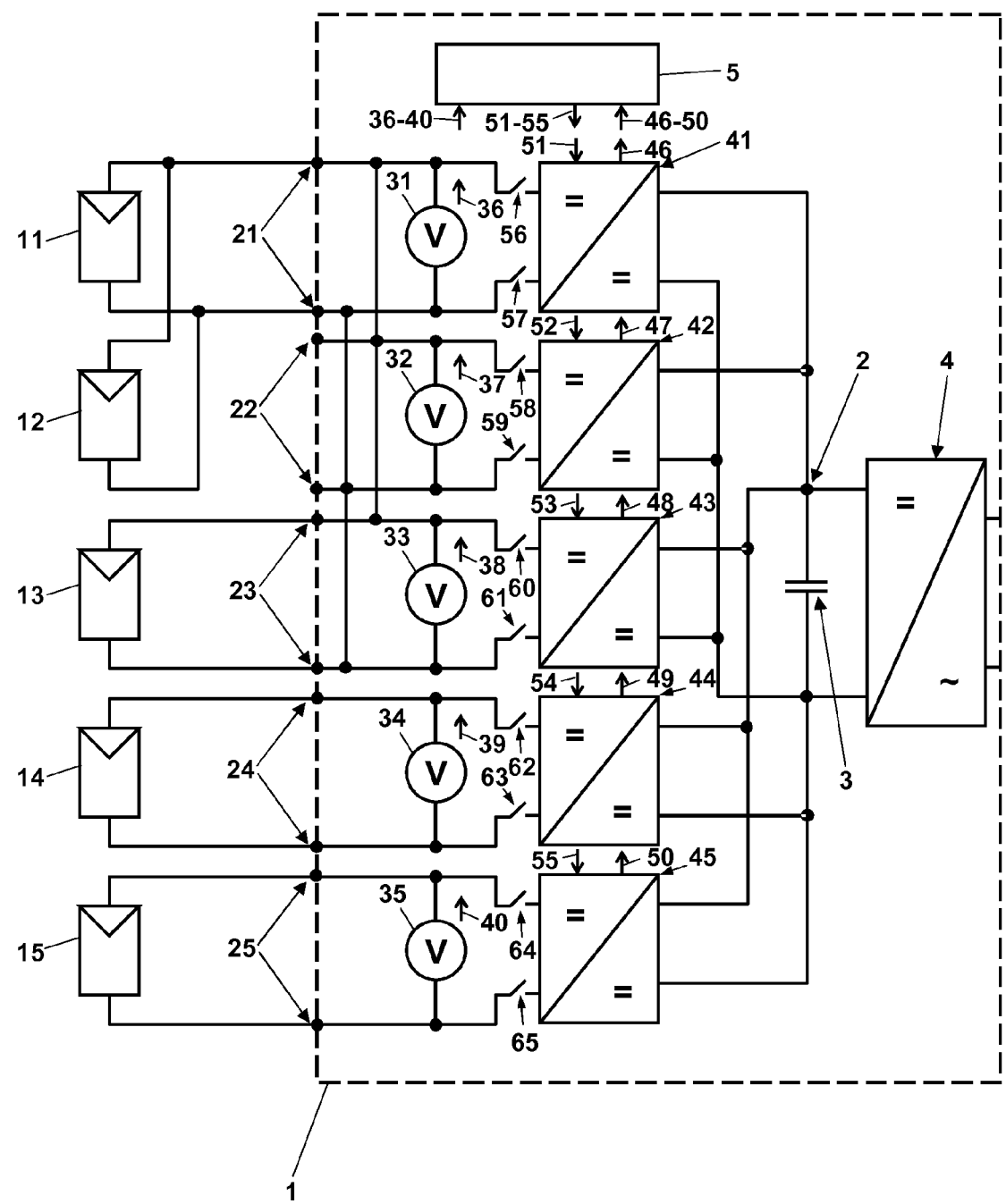

DETERMINING A STRING CONFIGURATION IN A MULTISTRING-INVERTER

REFERENCE TO RELATED APPLICATIONS

This application is a continuation of international application number PCT/EP2013/060580, filed on May 23, 2013, which claims priority to German application number 10 2012 104 560.7, filed on May 25, 2012.

FIELD

The present disclosure relates to a method of operating an inverter comprising a plurality of input connectors to which a plurality of strings of photovoltaic cells are connected, each input connector being connected via a DC/DC converter to a common DC voltage link, and the input connectors being bridgeable.

BACKGROUND

It is known to notify the bridged input connectors to a controller of a multistring-inverter via hardware or software to enable the controller to optimally operate the multistring-inverter whose input connectors may be bridged. Such hardware, for example, includes dip switches. Such software, for example, includes inputting the position of the switches into a control program. This input, however, may comprise mistakes. Particularly, it may be forgotten to notify an amendment to the bridging situation of the input connectors to the controller. Further, bridges between input connectors may also occur or fall away due to failures or sabotage. If, however, a multistring-inverter is operated based on wrong information about the bridges between its input connectors, high losses result as compared to the maximum feeding power possible at the same time. With long-term operation based on wrong information, restrictions to the lifetime at least of the DC/DC converters of the inverter are to be expected.

WO 2006/133714 A1 discloses a method of determining the type of connection of at least two electrical devices. Here, the input voltage at one of the input connectors of a multistring-inverter is varied by suitably controlling the associated DC/DC converter, and it is checked whether the input voltage at the other input connectors simultaneously varies between the same values. Particularly, the string connected to the respective input connector is loaded for this purpose by means of the DC/DC converter associated with the input connector. This determination will be repeated with using different input connectors and associated DC/DC converters. Further, the determination may, for example, be repeated during each startup of the inverter or every time when the inverter begins to feed electric power into an AC power grid. Thus, the determination of the type of connection of the strings according to the known method takes place prior to the actual operation of the inverter. Depending on the number of input connectors and the associated DC/DC converters, it may take some time to interrogate all different combinations of one input connector at which the input voltage is varied and of the input voltages observed at one of the other input connectors at the same time. During this determination, the voltage link is not yet fed with the maximum power available from the strings. This does not only mean a loss of principally feedable electric power but may even result in an undesired separation of the inverter from the respective AC power grid, because the respective individually loaded string or the respective individually loaded group of parallel connected strings alone is not yet sufficiently loadable for feeding electric power into the AC power grid. In this case, additional attempts of connecting the inverter to the AC power grid will be the result. These attempts stress the AC relays between the inverter and the AC power grid in an unnecessary way and thus reduce their lifetime.

There still is a need for a method of operating a multistring-inverter whose input connectors may be bridged, the method allowing for determining the string configuration without a considerable loss of electric energy feed and/or without additional attempts of connecting the inverter to an AC power grid.

SUMMARY

The disclosure provides a method of operating an inverter comprising a plurality of input connectors, wherein a plurality of strings of photovoltaic cells are connected to the plurality of input connectors, wherein each of the plurality of input connectors is connected to a common DC voltage link via a DC/DC converter, and wherein the input connectors are bridgeable. The method comprises capturing partial powers flowing through the individual DC/DC converters, and, at least for some time, either operating at least two of the DC/DC converters with the aim of balancing partial currents flowing through these DC/DC converters, or connecting through at least two of the DC/DC converters between the input connectors and the DC voltage link. While operating the at least two DC/DC converters with the aim of balancing the partial currents flowing through them or connecting through the at least two DC/DC converters, the partial powers flowing through the at least two DC/DC converters are compared to each other. If a difference between the partial powers of a first and a second of the at least two DC/DC converters exceeds a threshold value, the first and the second of the at least two DC/DC converters are subsequently operated in a way adjusted to the fact that different strings are connected to the DC voltage link via the first and the second of the at least two DC/DC converters.

The disclosure further provides an inverter comprising a plurality of input connectors to which a plurality of strings of photovoltaic cells are connected, which are each connected via a DC/DC converter to a common DC voltage link, and which are bridgeable, and comprising a controller operating the DC/DC converter. The controller is configured to operate the DC/DC converters according to the method of the present disclosure.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure can be better understood with reference to the following drawing. The components in the drawing are not necessarily to scale, emphasis instead being placed upon clearly illustrating the principles of the present disclosure. In the drawing, like reference numerals designate corresponding parts throughout the several views.

FIG. 1 is a schematic drawing of a multistring-inverter with a plurality of connected strings of photovoltaic cells.

DETAILED DESCRIPTION

The present disclosure relates to a method of operating an inverter comprising a plurality of input connectors to which a plurality of strings of photovoltaic cells are connected, each input connector being connected via a DC/DC converter to a common DC voltage link, and the input connectors being bridgeable. The disclosure relates to a method of operating a so-called multistring-inverter which, by means of a plurality of DC/DC converters, may operate different connected strings at different voltages, i.e. at different operation points, to obtain a maximum electrical power from the strings. In such a multistring-inverter, however, a plurality of DC/DC converters may be parallel connected between the same strings or their connectors and the common DC voltage link. This parallel connection may be used to distribute the current fed from the parallel connected strings into the DC voltage link over all parallel connected DC/DC converters at high power and over a reduced number of parallel connected DC/DC converters at low power to optimize the overall efficiency of the inverter. Thus, in a multistring-inverter, the DC/DC-converters are operated differently depending on the actual string configuration, i.e. depending on whether any input connectors are bridged and which input connectors are bridged, or, in other words, depending on which input connectors different or very same strings are connected to the inverter.

The present disclosure relates to a method of operating an inverter comprising a plurality of input connectors, wherein (i) a plurality of strings are connected to these input connectors, (ii) each of the input connectors is connected to a common DC voltage link via a DC/DC converter, and (iii) the input connectors are bridgeable. In operation of this inverter according to the present disclosure, partial powers flowing through the individual DC/DC converters are determined, and, at least for some time, at least two of the DC/DC converters are either operated with the aim of balancing partial currents flowing through these DC/DC converters, or connected through to directly connect the respective input connectors to the common DC voltage link. This means that the method, at least at the beginning and at least for two DC/DC converters, assumes that the very same strings are connected to the DC voltage link via these DC/DC converters. To check this assumption, the partial powers flowing through the at least two DC/DC converters are compared with each other while operating the at least two DC/DC converters either with the aim of balancing the currents flowing through them or to directly connect the respective input connectors to the common DC voltage link. If, with a first and a second of the at least two DC/DC converters, a difference between the partial powers flowing through them is noticed which exceeds a threshold value, this is regarded as a satisfying criterion for different, i.e. unbridged strings being connected to the DC voltage link via the first and the second DC/DC converter. The threshold value applied may essentially reflect the limits of the measuring accuracy as the difference between the partial powers flowing via the DC/DC converter which is compared to the threshold value is zero in an ideal case. The term "different" in the expression "different, i.e. unbridged strings" refers to all strings which are not the very same. This means that strings do not need to differ in any property or feature, despite the fact that they are not connected to bridged input connectors, to be regarded as different strings here. Correspondingly, all strings which are not the very same strings, are different strings in the sense of this description of the present disclosure. Vice versa, even strings that differ in any property or feature but are connected to bridged input connectors are not regarded as different but as same strings here.

The partial currents through the DC/DC converters to be balanced may be either input currents or output currents of the individual DC/DC converters. The input currents flow from the strings of solar cells into the individual DC/DC converters, whereas the output currents flow from the individual DC/DC converters into the common voltage link of the inverter. Depending on whether the DC/DC converters are boost converters or buck converters, balancing the input currents (in case of a boost converter) or balancing the output currents (in case of a buck converter), i.e. using these currents as the input values of a controller implementing the balancing, may be advantageous.

A connected through or inactive DC/DC converter directly connects the respective input connector to the common DC voltage link of the inverter, i.e. without amending the input voltage present at the input connector. Connecting through may include—and must include with some DC/DC converters, like for example, so-called high frequency converters—bypassing the active components of the respective DC/DC converter.

For the purpose of determining the partial powers flowing through the individual DC/DC converters, the input voltages present at the individual input connectors and the input currents of the individual DC/DC converters may be measured. The partial powers are the products of these values. The input voltages at the input connectors are measured in most inverters anyway; the input currents of the individual DC/DC converters are anyway needed when they are to be balanced as the partial currents flowing through the individual DC/DC converters.

Alternatively, only the output currents of the individual DC/DC converters may be measured for determining the partial powers flowing through the individual DC/DC converters. The actual partial powers flowing through the individual DC/DC converters may be calculated by multiplying these output currents by the link voltage of the DC voltage link. This calculation of the actual partial powers, however, is not necessary as the factor of the intermediate link voltage is the same for all partial powers. In other words, the output currents of the DC/DC converters may be compared directly as measures of the partial powers flowing through the DC/DC converters.

A further opportunity to get along with a single measurement value per DC/DC converter arises within a group of DC/DC converters operated with the aim of balancing their input currents. In this case, the input currents of the respective DC/DC converters may be assumed as being equal due to being balanced. As the partial powers are the products of input currents and input voltages of the DC/DC converters, the input voltages are thus direct measures of the partial powers flowing through the individual DC/DC converters. Thus, in this case, it is sufficient for comparing the partial powers flowing through the DC/DC converters to compare the input voltages of the DC/DC converters, as the balanced input currents would only contribute a factor to the partial powers which is the same for all DC/DC converters.

When the monitored DC/DC converters are operated with the aim of balancing the partial currents flowing through the DC/DC converters, for which purpose these partial currents have to be measured anyway, the actually measured partial currents through the individual DC/DC converters may be compared for primarily comparing the partial powers flowing through the DC/DC converters. If differences that exceed a threshold value which is set considering the limits of the controller balancing the partial currents can not be eliminated, this is a satisfying criterion for different strings being connected to the monitored DC/DC converter, independently of the associated voltages.

The information on the present string configuration obtained by comparing the partial powers flowing through the at least two DC/DC converters are considered in the further operation of the first and the second DC/DC converter. This particularly means, that it is no longer tried to balance the partial currents flowing through the first and the second DC/DC converter, if it emerged that different, i.e. unbridged strings are connected to the common DC voltage link via the first and the second DC/DC converter. Balancing particularly serves for uniformly using a plurality of DC/DC converters via which the same strings are connected to the DC voltage link. Thus, balancing is only suitable if in fact the same strings are connected to the plurality of DC/DC converters.

On the other hand, when operating the first and the second DC/DC converter considering that different strings are connected to the DC voltage link via the first and the second DC/DC converter, the first and the second DC/DC converters may be operated for individually tracking the MPP of the connected strings.

It is within the scope of the present disclosure that, during operating the DC/DC converters with the aim of balancing the partial currents flowing through the DC/DC converters into the DC voltage link, initially a higher number of DC/DC converters than two is operated in this way. Then, the partial currents flowing through the DC/DC converters and/or the input voltages present at the associated input connectors may be compared with each other to assume from different partial currents and/or input voltages of a first group and a second group of the DC/DC converters but same partial currents and input voltages within the respective groups that different strings are connected to the voltage link via the first and the second group of the DC/DC converters. Afterwards, the first and the second group of the DC/DC converters may be operated based on these assumptions with regard to the present string configuration. This may, for example, mean that the DC/DC converters within the individual groups are afterwards operated with the aim of balancing the partial currents flowing through them, but that no further balancing is tried with regard to DC/DC converters belonging to different groups. Even with the continued attempts of balancing within the individual groups, different partial currents and/or input voltages may occur in the subsequent operation of the inverter, which are indications that even within the previously determined groups different DC/DC converters connect different strings to the common DC voltage link. Then, these groups have to be subdivided further until either a permanent balancing within each remaining group is possible, or the group only consists of a single DC/DC converter. Generally, it has to be noted that an unbridged state of two strings is always unambiguously determined, i.e. based on different partial powers flowing through the DC/DC converters. In contrast, same partial powers flowing through the DC/DC converters are an indication, but no satisfying criterion for a bridged state of the two strings monitored.

For example, a case may occur in which strings with at least essentially the same properties, which are operated under the same operation conditions or in the same operation surroundings, are not recognized as different, i.e. unbridged strings in the method according to the present disclosure for a long time as the partial currents flowing from them may be balanced with same input voltages. In this case, however, it is also harmless that these strings are controlled for being operated at the same operation points by balancing their partial currents, as the MPPs of the strings—due to their same properties and operation conditions or operation surroundings—will also be the same. In other words, the method according to the present disclosure only differentiates between a plurality of strings which are together connected to a plurality of input connectors and a plurality of strings which are each individually connected to one of a plurality of input connectors, if this differentiation is suitable for maximizing the electric energy available from the strings or for other reasons.

Starting from this basic idea, it is possible to at first either operate all DC/DC converters with the aim of balancing the partial currents flowing through the DC/DC converters, or directly connect the all input connectors to the common DC voltage link. Only afterwards, according to the necessities, it will be differentiated between such DC/DC converters which—due to the measured partial currents and/or input voltages—are associated with different connected strings and which thus indicate that a different operation would be suitable to, for example, approach different MPP operation points of the strings.

The method according to the present disclosure, however, does not generally exclude to obtain a first overview over the probably bridged or securely unbridged strings also based on other methods. Thus, it is possible to initially operate at least one DC/DC converter individually to selectively load all strings connected to the intermediate voltage link via this DC/DC converter. Simultaneously, the input voltages present at all input connectors are monitored to afterwards pool all those DC/DC converters in one group, in which the input voltages at the associated input connectors simultaneously dropped due to the load. In the following, at least those DC/DC converters within this group are operated with the aim of balancing the partial currents flowing through the DC/DC converters. DC/DC converters in which the input voltages at the associated input connectors do not synchronously change with the input voltage at the individually operated DC/DC converter cannot be connected to the very same strings as the individually operated DC/DC converter. Correspondingly, there is no use in trying to balance the partial currents flowing through these DC/DC converters. However, this method also differentiates between strings which are essentially equal and which thus require no different operation of the associated DC/DC converters. An independent operation of these DC/DC converters, however, is also harmless in this case.

A further option in obtaining a first overview over the probably bridged or securely unbridged strings is measuring the no-load voltages in the unloaded state of the strings. Here, it is advantageous to initially separate all strings from the DC/DC converters by means of suitable switching elements. Afterwards, all no-load voltages of the strings are measured, and those strings are combined in groups which display a same no-load voltage. Strings whose no-load voltages differ beyond the measurement uncertainty can not be bridged and thus do not belong to a common group. In applying this option, it has to be cared for that the switching elements, from the point of view of the strings, are behind the potential bridging positions so that strings which are interconnected via bridges may also be detected as being bridged with open switching elements.

When it has been determined in the method according to the present disclosure that very same strings are connected to the DC voltage link via a plurality of DC/DC converters, so many of these DC/DC converters may be turned off that the remaining DC/DC converters feed the current from the strings into the DC voltage link at a maximum efficiency. If the input connectors which have up to now been assigned to the very same strings in fact include one input connector to which only a same, i.e. equal string is connected, this will be noticed upon deactivating the first DC/DC converter. At least then, the previous symmetry of the input voltages will be lost.

In the method of the present disclosure, information about via which DC/DC converters different strings are connected to the common DC voltage link may be stored. This information may then, for example, be used for operating the DC/DC converters until indications of an amended string configuration are present. Usually, such amendments to the string configuration are only expected when the inverter is closed down. Correspondingly, the information about via which DC/DC converters different strings are connected to the DC voltage link may be cancelled or erased when the inverter is closed down. According to the method of the present disclosure, this information is very quickly obtained again so that cancelling the information and obtaining it again causes no damage, even if the string has not been amended.

On the other hand, it may be suitable to store the information about the string configuration detected at last for a longer period of time and to nevertheless carry out the described method of determining the string configuration after each startup of the inverter. When the new result is compared to the previously stored result, a difference indicates an amendment to the string configuration. This amendment may have been caused voluntarily—for example by a technician—, however, it may also be due to an undesired influence—like for example sabotage. In any case, particularly in the latter case, it is sensible to forward the detected amendment to the string configuration from the inverter to a surveying unit, for example, via a GSM message.

An inverter according to the present disclosure is characterized in that its controller is configured to operate its DC/DC converters according to the method of the present disclosure.

Now referring in greater detail to the drawings, FIG. 1 schematically depicts a multistring-inverter 1 to which strings 11 to 15 are connected. The strings 11 to 15 each comprise a plurality of solar cells connected in series. The solar cells may additionally be parallel connected and grouped as modules. The number of strings 11 to 15 here corresponds to a number of input connectors 21 to 25 of the inverter 1. Generally, there may be even more strings 11 to 15 than input connectors 21 to 25. Further, the strings 11 to 15 may generally have same or different properties, which does not only relate to their construction but also to their orientation and their general operation surroundings. At each of the input connectors 21 to 25, a voltmeter 31 to 35 is provided for measuring the input voltage of the inverter 1 present at this input connector. Further, a DC/DC converter 41 to 45 is assigned to each one of the input connectors 21 to 25, via which the respective input connector is connected to a common DC voltage link 2 comprising a capacitor 3. The DC voltage link 2 is the input link of a DC/AC converter 4 of the inverter 1 which outputs an AC current. In FIG. 1, the inverter 1 is depicted as a single-phase inverter which outputs a single-phase AC current. However, the inverter may be and will often be a multi-phase inverter, and it may particularly output a three-phase AC current. The input voltages 36 to 40 measured by the voltmeters 31 to 35 are registered and processed by a controller 5 of the inverter 1 together with partial currents 46 to 50 which are determined by measurement devices of the DC/DC converters 41 to 45. The partial currents 46 to 50 may either be input currents or output currents of the DC/DC converters 41 to 45. In turn, the controller 5 outputs control signals 51 to 55 to the DC/DC converters 41 to 45.

According to FIG. 1, the strings 11 and 12 are directly connected to the input connector 21 via a common pair of connector lines, whereas no string is directly connected to the input connector 22. The strings 13 to 15 are each connected to the input connectors 23 to 25 via own connector lines. Additionally, the input connectors 21 to 23 are bridged, i.e. the strings 11 to 13 and the DC/DC converters 41 to 43 are already parallel connected upstream of the DC voltage link 2. This is suitable with principally equal properties of the strings 11 to 13. In contrast, the strings 14 and 15 are independently from each other and from the other strings 11 to 13 connected to the DC voltage link 2 via associated DC/DC converters 44 and 45, because the strings 14 and 15, for example, have different properties with regard to each other and with regard to the strings 11 to 13.

For separating the strings 11 to 15 from the DC/DC converters 41 to 45, switches 56 to 65 are provided for each input connector 21 to 25, which separate all poles of the strings 11 to 15 from the DC/DC converters if necessary. There may be cases in which a single-pole separation of the strings 11 to 15 from the DC/DC converters is sufficient. The switches 56 to 65 are arranged between the bridges via which the individual strings are parallel connected and the DC/DC converters. In this way it is assured that upon operating the switches 56 to 65, the parallel connection of the individual strings provided by the bridges remains unchanged.

The controller 5 determines this string configuration as follows: Initially, the controller 5 checks whether there are differences in the input voltages 36 to 40. This check takes place with open switches 56 to 65. In this way, it is ensured that the input voltages are true no-load voltages of the strings 11 to 15. If there are differences in these input voltages, the strings connected to the input connectors at which different input voltages are present are not the very same but different. In the string configuration according to FIG. 1, this means that the input voltages 39 and 40 may differ from each other and from the input voltages 36 to 38. The input voltages 36 to 38, however, will be equal despite unavoidable measurement inaccuracies. Both the input voltage 40 and the input voltage 39 may vice versa be equal to the input voltages 36 to 38. This particularly applies if all strings 11 to 15 are essentially equal and have essentially equal operation surroundings or even because all strings 11 to 15 are still unloaded.

So far as the controller 5 determines different input voltages 36 to 40, it assigns the respective input connectors 21 to 25 to different groups. Within each group of input connectors 21 to 25 which initially show a same input voltage 36 to 40, the controller 5 then tries to balance the partial currents 46 to 50 flowing through the respective DC/DC converters 41 to 45 by appropriately operating the DC/DC converters 41 to 45. This is a suitable operation of the DC/DC converter 41 to 45 when assuming that the strings of the respective group are connected in parallel to uniformly load the associated DC/DC converters 41 to 45. If, as a result of this operation, different input voltages 36 to 40 occur, or if it is even impossible to adjust equal partial currents 46 to 50, i.e. if in any case no equal partial powers flow through the individual DC/DC converters, these are again indications that still not the very same strings are connected to the common DC voltage link via the input connectors of the respective group. Correspondingly, the groups of the DC/DC converters 41 to 45, which are operated by the controller 5 for balancing the partial currents 46 to 50, are made smaller until only the same input voltages 36 to 40 and same partial currents 46 to 50 are measured within the respective group.

This is the case with the input connectors 21 to 23 and the associated DC/DC converters 41 to 43 even if individual strings of the strings 11 to 13 are, for example, shaded, because the strings 11 to 13 are interconnected by means of the bridged input connectors 21 to 23 to form a single unit. In contrast, the strings 14 and 15 may generate different input voltages 39 and 40 and also different partial currents 49 and 50, particularly at their respective MPP. Correspondingly, the controller 5, once the string configuration has been determined, operates the DC/DC converters 44 and 45 for individual MPP tracking. Vice versa, the controller 5, after this determination of the string configuration, with only little electric power being provided by the strings 11 to 13, may switch off one or two of the DC/DC converters 41 to 43 by, for example, opening the corresponding switches 56 to 61 to operate the remaining DC/DC converters at a higher utilization and thus at a higher overall efficiency. The selection of the selectively operated DC/DC converters may be cyclically changed to load or stress all DC/DC converters 41 to 43 uniformly.

Up to here, it has been described how the DC/DC converters 41 to 45 within one group are operated in operation of the inverter 1 such that the partial currents 46 to 50 flowing through these DC/DC converters are balanced. If it is then noticed that the individual partial powers, i.e. the input voltages 36 to 40 and/or the partial currents 46 to 50, within this group are different in view of the measurement inaccuracy, it is concluded that those strings whose input voltages 36 to 40 and/or partial currents 46 to 50 differ from those of the other strings within this group are not parallel connected with these other strings. Correspondingly, the groups are adjusted or made smaller until, within each group, only strings 11 to 15 or DC/DC converters 41 to 45 with same partial powers, i.e. same input voltages 36 to 40 and same partial currents 46 to 50, are present.

An analysis of the string configuration based on the same principle of comparing partial powers of the individual DC/DC converters may also be executed when individual DC/DC converters or even all DC/DC converters are not operated but connected through so that the respective input connectors are directly connected to the common DC voltage link. This connecting through deactivates the DC/DC converters without stopping the current flow through them. For this purpose, it may be necessary to bypass the DC/DC circuitry, like in case of a buck converter. Such a connecting through may, for example, be effected if the voltages of the strings present as the input voltages are suitable to feed electric power into an AC power grid connected to the inverter 1 as such, i.e. without adjusting these voltages. Also in this case, the comparison of the partial powers, i.e. the input voltages 36 to 40 and the partial currents 46 to 50, may still be used to determine if—and if yes which—strings 11 to 15 or which of the input connectors 21 to 25 and the associated DC/DC converters 41 to 45 are already parallel connected upstream of the DC voltage link 2. In this case, the input voltages of the strings which are connected to deactivated, i.e. connected through, DC/DC converters 41 to 45 are equal to the link voltage. Thus, the individual partial currents 46 to 50 which flow through the connected through DC/DC converters 41 to 45 are a direct measure of the partial powers flowing through the DC/DC converters 41 to 45. Partial currents which differ from other partial currents 46 to 50 are thus a satisfying criterion for the connected strings not being parallel connected with other strings which generate equal partial currents through the DC/DC converters connecting them to the DC voltage link 2. Correspondingly, it is also possible here to resolve the groups of the strings such that only those strings with same input voltages 36 to 40 and same partial currents 46 to 50 which flow through the connected through DC/DC converters remain in each group.

Many variations and modifications may be made to the embodiments of the disclosure without departing substantially from the spirit and principles of the disclosure. All such modifications and variations are intended to be included herein within the scope of the present disclosure, as defined by the following claims.

The invention claimed is:

1. A method of operating an inverter comprising a plurality of input connectors, wherein a plurality of strings of photovoltaic cells are configured to connect respectively to the plurality of input connectors, wherein each of the plurality of input connectors is connected to a common DC voltage link via a respective DC/DC converter, and wherein the input connectors are bridgeable, the method comprising:
   determining partial powers flowing through the individual DC/DC converters; and
   at least for some time either operating at least two of the DC/DC converters with the aim of balancing partial currents flowing through these at least two DC/DC converters, or connecting through the at least two of the DC/DC converters between the respective input connectors and the DC voltage link,
   wherein, while operating the at least two DC/DC converters with the aim of balancing the partial currents flowing through them or connecting through the at least two DC/DC converters, the partial powers flowing through the at least two DC/DC converters are compared to each other, and
   wherein, if a difference between the partial powers of a first and a second of the at least two DC/DC converters exceeds a threshold value, the first and the second of the at least two DC/DC converters are subsequently operated in a way that is adjusted due to a conclusion that different strings are connected to the DC voltage link via the first and the second of the at least two DC/DC converters.

2. The method of claim 1, further comprising measuring input voltages present at the individual input connectors and measuring input currents of the individual DC/DC converters to determine the partial powers flowing through the individual DC/DC converters.

3. The method of claim 1, further comprising measuring output currents of the individual DC/DC converters to determine the partial powers flowing through the individual DC/DC converters.

4. The method of claim 1, wherein, when the at least two DC/DC converters are operated with the aim of balancing their partial currents flowing through them, the input voltages of the individual DC/DC converters are measured and compared for comparing the partial powers flowing through the at least two DC/DC converters.

5. The method of claim 1, wherein, when the at least two DC/DC converters are operated with the aim of balancing the partial currents flowing through them, the actual partial currents flowing through the individual DC/DC converters are compared for an initial comparison of the partial powers flowing through the at least two DC/DC converters.

6. The method of claim 1, wherein, when operating the first and the second DC/DC converter adjusted due to the conclusion that different strings are connected to the DC voltage link via the first and the second of the at least two DC/DC converters, the first and the second of the at least two DC/DC converters are no longer operated with the aim of balancing the partial currents flowing through them.

7. The method of claim 1, wherein, when operating the first and the second DC/DC converter adjusted due to the conclusion that different strings are connected to the DC voltage link via the first and the second of the at least two DC/DC converters, the first and the second of the at least two DC/DC converters are operated to track separate maximum power points (MPPs) of the connected strings.

8. The method of claim 1, wherein initially either all DC/DC converters are operated with the aim of balancing the partial currents flowing through them or all DC/DC converters are connected through.

9. The method of claim 1, wherein, prior to either operating the at least two DC/DC converters with the aim of balancing the partial currents flowing through them or connecting through the at least two DC/DC converters, measuring the input voltages present at at least some of the input connectors in an unloaded state of the connected strings, wherein subsequently all DC/DC converters in which the measured input voltages at the associated input connectors are substantially equal are either operated with the aim of balancing the partial currents flowing through them, or connected through between the input connectors and the DC voltage link.

10. The method of claim 1, wherein, prior to either operating the at least two DC/DC converters with the aim of balancing the partial currents flowing through them or connecting through the at least two DC/DC converters, individually operating at least one DC/DC converter in order to selectively load all strings which are connected thereto to the DC voltage link, wherein the input voltages present at all input connectors are monitored, and wherein subsequently all DC/DC converters in which the input voltages at the associated input connectors dropped as a consequence of the load are either operated with the aim of balancing the partial currents flowing through them or connected through between the input connectors and the DC voltage link.

11. The method of claim 1, further comprising shutting off a sufficient number of DC/DC converters of a plurality of DC/DC converters via which the very same strings are connected to the DC voltage link so that the remaining DC/DC converters of this plurality of DC/DC converters forward the current from these strings at a maximum efficiency to the DC voltage link.

12. The method of claim 1, further comprising storing information about via which DC/DC converters different strings are connected to the DC voltage link.

13. The method of claim 12, further comprising using the information about via which DC/DC converters different strings are connected to the DC voltage link for operating the DC/DC converters of the inverter.

14. The method of claim 13, further comprising comparing the information about via which DC/DC converters different strings are connected to the DC voltage link to previously determined information, and wherein in case that the information determined at last differs from the previously determined information an alarm signal is generated.

15. An inverter, comprising:
a plurality of input connectors configured to couple to a plurality of strings of photovoltaic cells, wherein the plurality of input connectors are bridgeable;
a plurality of DC/DC converters coupled between the plurality of input connectors respectively and a common DC voltage link; and
a controller operably coupled to each of the plurality of DC/DC converters, wherein the controller is configured to:
determine partial powers flowing through the individual DC/DC converters; and
at least for some time either operate at least two of the DC/DC converters with the aim of balancing partial currents flowing through these at least two DC/DC converters, or connect through the at least two of the DC/DC converters between the respective input connectors and the DC voltage link,
wherein, while operating the at least two DC/DC converters with the aim of balancing the partial currents flowing through them or connecting through the at least two DC/DC converters, the partial powers flowing through the at least two DC/DC converters are compared to each other, and
wherein, if a difference between the partial powers of a first and a second of the at least two DC/DC converters exceeds a threshold value, the first and the second of the at least two DC/DC converters are subsequently operated in a way that is adjusted due to a conclusion that different strings are connected to the DC voltage link via the first and the second of the at least two DC/DC converters.

* * * * *